United States Patent [19]
Wang

[11] Patent Number: 5,092,567
[45] Date of Patent: Mar. 3, 1992

[54] PRESSURE ACTUATED ASSEMBLY

[76] Inventor: John Wang, No. 129, Tuan-Chu Lane, Tuan-Chu Li, Chiayi, Taiwan

[21] Appl. No.: 658,190

[22] Filed: Feb. 20, 1991

[51] Int. Cl.$^5$ ............................................. F16F 7/00
[52] U.S. Cl. ............................. 267/141; 267/140.1 A; 267/141.4
[58] Field of Search ............... 267/141, 141.1, 141.4, 267/141.6, 153, 35, 141.5, 143, 151, 140.1, 123, 64.17

[56] References Cited

U.S. PATENT DOCUMENTS

| | | | |
|---|---|---|---|
| 2,917,264 | 12/1959 | Hartenstein | 267/141.6 |
| 3,315,951 | 4/1967 | Boschi et al. | 267/141 X |
| 3,606,295 | 9/1971 | Appleton | 267/141.1 X |
| 3,677,869 | 7/1972 | Chung et al. | 267/141 X |
| 4,354,397 | 10/1982 | Fix | 267/141 X |
| 4,537,275 | 8/1985 | Kimura et al. | 267/141.5 X |
| 4,781,365 | 11/1988 | Harrison | 267/141.1 X |
| 4,886,251 | 12/1989 | Häussermann | 267/35 X |

Primary Examiner—Joseph F. Peters, Jr.
Assistant Examiner—Carla Mattix
Attorney, Agent, or Firm—Fish & Richardson

[57] ABSTRACT

A housing includes a first and second truncated cone-shape member. Each has a converging end and a diverging end. The converging ends are joined together to form a neck portion. A non-stretchable hoop is provided around on the neck portion. The diverging end of the first truncated cone-shaped member has a first flange with an annular groove thereof and the diverging end of said second truncated cone-shaped member has a second flange portion which is insertable into said annular groove. Two plates are respectively mounted on the flange portions to hermetically seal the housing.

8 Claims, 4 Drawing Sheets

PRESSURE ACTUATED ASSEMBLY

BACKGROUND OF THE INVENTION

1. Field of Invention

The invention relates to a pressure actuated assembly, more particularly to a pressure actuated assembly which can be used as a cushion device since it contracts when pressure is applied to the same and expands when the pressure is released.

2. Discussion of the Related Art

A cushion device can be placed between a base and a mechanical apparatus and its mounting to act as a buffer helping to prevent damage to the apparatus. Currently, various types of cushion devices exist, such as hydraulic chambers and air cushions. Each is useful in its own way. The constructions of these cushion devices therefore differ from one another.

SUMMARY OF THE INVENTION

An object of the present invention is to provide a pressure actuated assembly which can not only be used as a cushion device but is also easy to produce at low expense because it can be manufactured by a single mold.

According to the present invention, a pressure actuated assembly includes a housing having a first truncated cone-shaped member and a second truncated cone-shaped member. Each of the truncated cone-shaped members has a converging end and a diverging end. The converging ends are joined together so that a neck portion is formed thereat. The housing is made of flexible resilient material and has a hollow portion extending from one diverging end to the other. Each of the diverging ends has a flange portion extending outward from the periphery of the same. The flange portion of the first truncated cone-shaped member has an annular groove into which the flange portion of the second truncated cone-shaped portion is insertable. Two closing plates are mounted respectively on each of the flange portions in such a manner that they close and seal the housing, so the housing can contain hydraulic fluid therein. A non-stretchable hoop is provided around the neck portion so that it can not expand outward when pressure is applied to the diverging ends. The housing thus formed can be used as a cushion device.

BRIEF DESCRIPTION OF THE DRAWING

Other features and advantages of the present invention will become more apparent in the following detailed description, including drawings, all of which shows a non-limiting forms of the invention, and of which.

DETAILED DESCRIPTION OF THE PREFERRED EMBODIMENT

Figure 1:
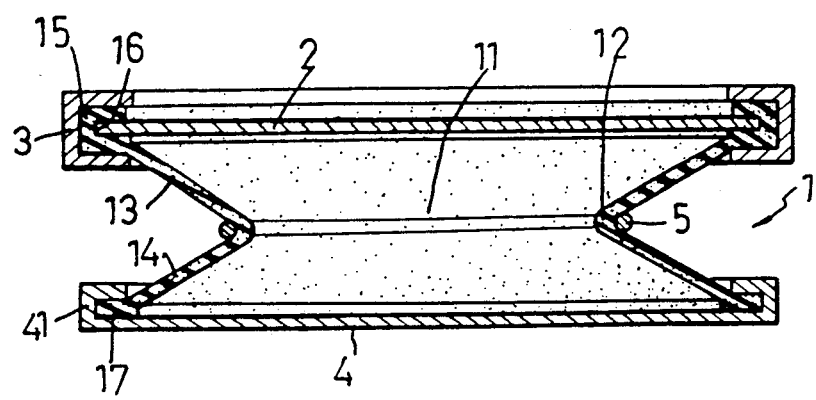
FIG. 1 shows a preferred embodiment of a pressure actuated assembly according to the present invention.
Figure 3:
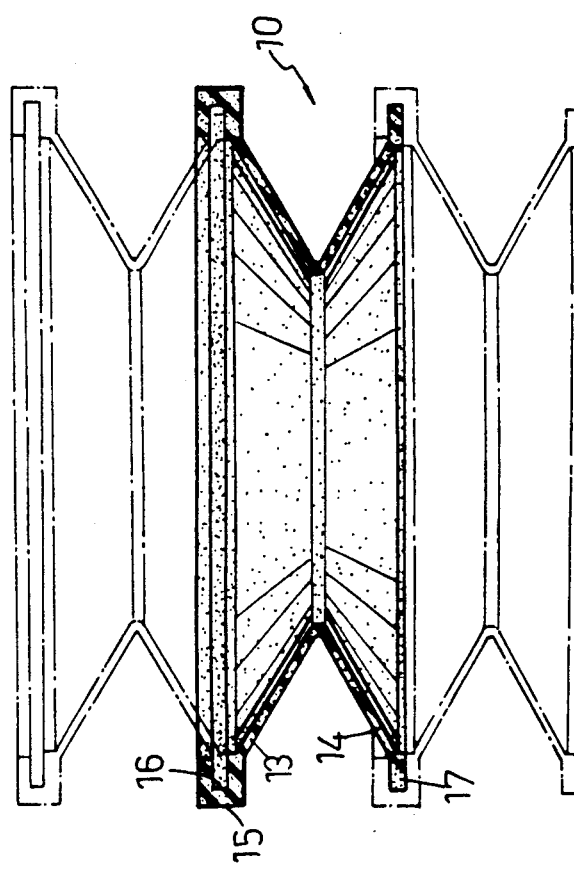
FIG. 3 is an elevational view of the preferred embodiment of the present invention in use in another way.
Figure 4:
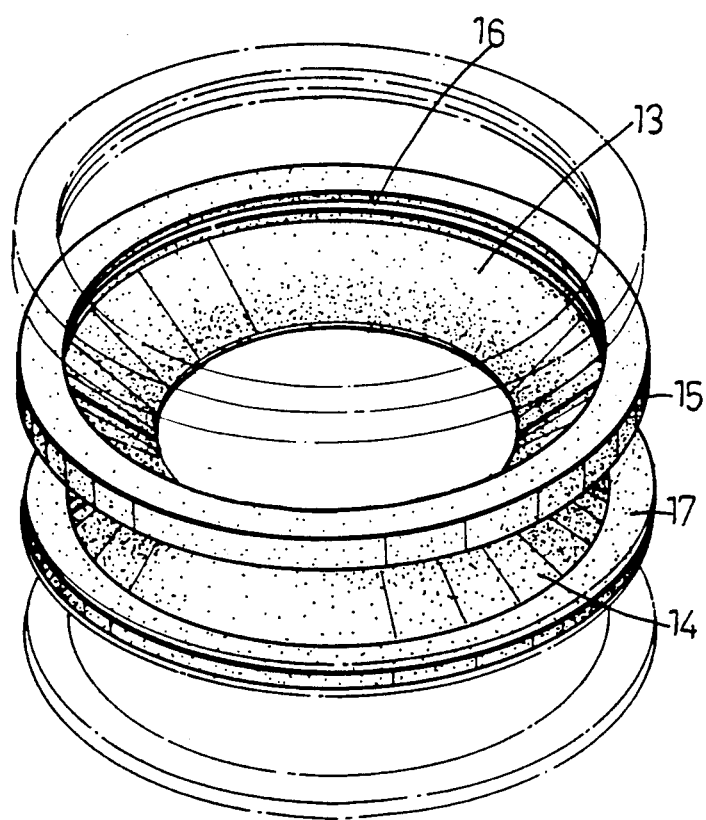
FIG. 4 is a top view of the preferred embodiment of FIG.3.

Referring to FIG. 1, a pressure actuated assembly of the present invention includes a housing (1), made of a flexible resilient material and produced by a single mold, and having a first truncated cone-shaped member (13) and a second truncated cone-shaped member (14). Each of the truncated cone-shaped members (13,14) has a converging end and a diverging end. The converging ends are joined together so that a neck portion (12) is formed thereat. The housing (1) further has a hollow portion (11) extended from one diverging end to the other diverging end. Each of the diverging ends has a flange portion (15,17) extending outward from the periphery of the same. The flange portion (15) has an annular groove (16) formed therein into which the flange portion (17) of the second truncated cone-shaped member can be inserted, so that a long housing (10) as shown in FIG. 3 can be formed by concatenating a plurality of housings (1). FIG. 4 shows a top view of the long housing thus formed.

Figure 2:
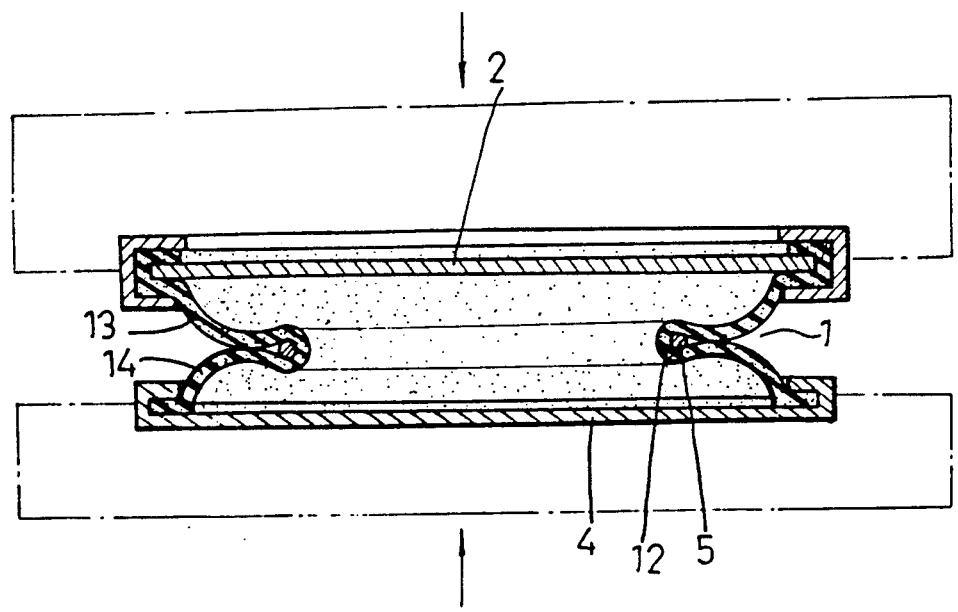
FIG. 2 shows a configuration of first preferred embodiment of FIG. 1 when a pressure is applied to the same.

In the present embodiment, a first closing plate (2) is inserted in the annular groove (16) of the flange portion (15) of the first diverging ends. The flange - portion (15) is tightly clamped by a clamp member (3). A second clamping member (41) is integrally formed with a second closing plate (4) and also clamps the flange portion (17) of the second truncated cone-shaped member (14) so that any hydraulic oil can be contained in the housing without leaking. To serve as a cushion device more effectively, a non-stretchable hoop (5) is provided at the neck portion (12) of the housing, therefore when pressure is applied to either end of the housing, the neck portion will not extend outward, as shown in FIG. 2. The housing will contract in proportion to the magnitude of the applied pressure. When the applied pressure is released, the housing will regain its initial shape due to the restoring force of the flexible resilient material from which the housing is made. In this embodiment, a compression gas can be used instead of the hydraulic oil. The features and objects of a gas filled embodiment are the same as above explained.

Figure 5:
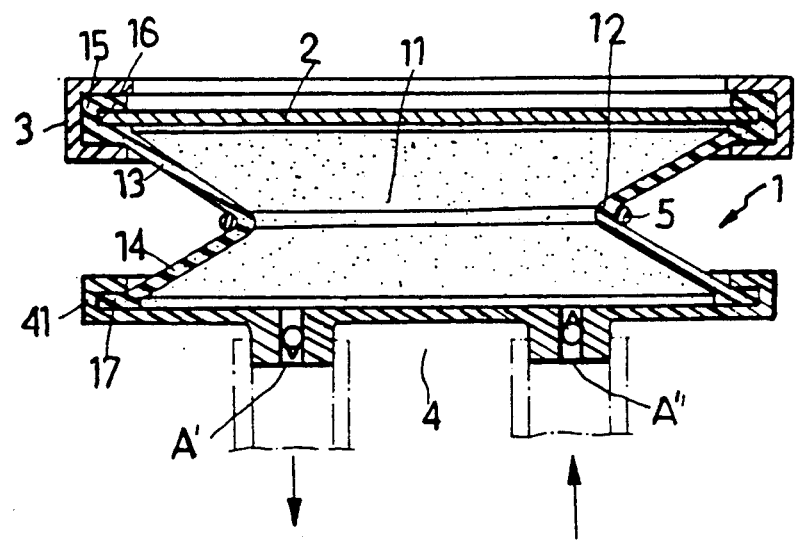
FIGS. 5 and 6 show the preferred embodiment of the pressure actuated assembly according to the present invention in use in still another way.
Figure 6:
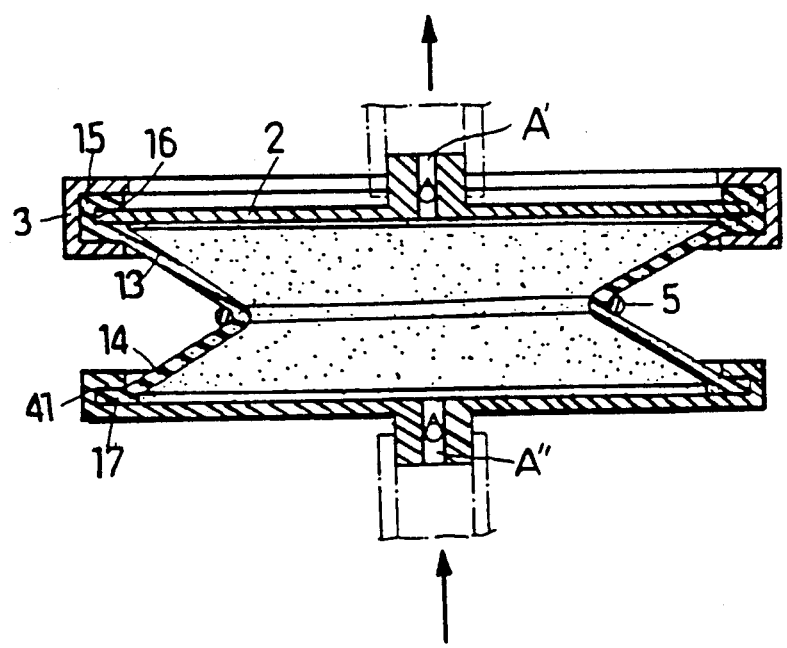

Alternatively, the pressure actuated assembly can be used as a pump. The plate (2,4) of the pressure actuated assembly can be provided with two check valves (A',A"), which open in opposite directions as shown in FIG. 5. Two oil tanks (not shown) are respectively connected to the housing through said valves (A',A") so that when pressure is applied to the housing, the valve (A') allows the oil to flow out of the housing into a first tank. When the applied pressure is released, the oil from the second tank flows into the housing through the valve (A") due to pressure differential between the housing and the second tank. Thus oil from the second tank is pumped into the first tank. Alternatively, the plate (2,4) of the pressure actuated assembly can be provided with two check valves (A',A") which open in same direction as shown in FIG. 6. The features and objects are same as above described.

With the invention thus explained, it is obvious to those skilled in the art that various modifications and variations can be made without departing from the scope and spirit of the present invention. It is therefore intended that this invention be limited only as indicated in the appended claims.

I claim:

1. A pressure actuated assembly comprising:

an integral housing element including a first truncated cone-shaped portion and a second truncated cone-shaped portion, each of said first and second truncated cone-shaped portions having a converging end and a diverging, end said converging ends intersecting at a neck region, said housing element having a wall made of flexible resilient material and defining an enclosed volume extending from one of said diverging ends, through said neck region, to the other of said diverging ends, each of said diverging ends having a volume closing element respectively mounted thereto for hermetically sealing said enclosed volume of said housing element, said wall of said housing element forming said first and second truncated cone-shaped portions having a generally constant thickness from said diverging end to said converging end of said first truncated cone-shaped portion and from said diverging end to said converging end of said second truncated cone-shaped portion, and said enclosed volume containing fluid, whereby pressure imparted to said volume closing elements moves said housing element into a retracted position proportional to the magnitude of said pressure, said housing element being extendible when said imparted pressure is released from said volume closing elements.

2. A pressure actuated assembly as claimed in claim 1, wherein each said volume closing element includes a circular plate and a clamping member clamping said circular plate on said diverging end.

3. A pressure actuated assembly as claimed in claim 2, wherein one of said circular plates has two check valves provided thereon, said check valves opening in opposite directions.

4. A pressure actuated assembly as claimed in claim 2 wherein each of said two circular plates has a valve, the valve in one of said circular plates opening in a first direction and the valve in the other of said circular plates opening in a second direction, the first direction being opposite to the second direction, relative to said housing element.

5. A pressure actuated assembly as claimed in claim 1, wherein one of said diverging ends has a first flange portion and the other one of said diverging ends has a second flange portion.

6. A pressure actuated assembly as claimed in claim 5, wherein said first flange portion has an annular groove extending outwardly from the periphery of said diverging end.

7. A pressure actuated assembly as claimed in claim 6, wherein said pressure actuated assembly includes two said housing elements, said second flange portion of one said housing elements being insertable into said annular groove of the first flange portion of the other said housing elements.

8. A pressure actuated assembly as claimed in claim 1 wherein a non-stretchable hoop ring is provided around said neck region.

* * * * *